(12) United States Patent
Gruskin et al.

(10) Patent No.: US 10,880,287 B2
(45) Date of Patent: Dec. 29, 2020

(54) OUT OF BOX EXPERIENCE APPLICATION API INTEGRATION

(71) Applicant: DROPBOX, INC., San Francisco, CA (US)

(72) Inventors: Samantha Gruskin, San Francisco, CA (US); Chris Varenhorst, San Francisco, CA (US); Rohan Sharma, San Francisco, CA (US); Sara Lannin, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 26 days.

(21) Appl. No.: 16/514,882

(22) Filed: Jul. 17, 2019

(65) Prior Publication Data

US 2019/0342277 A1 Nov. 7, 2019

Related U.S. Application Data

(63) Continuation of application No. 15/167,751, filed on May 27, 2016, now Pat. No. 10,362,013.

(51) Int. Cl.
| | |
|---|---|
| *H04L 29/06* | (2006.01) |
| *G06F 21/62* | (2013.01) |
| *H04L 29/08* | (2006.01) |
| *G06F 8/61* | (2018.01) |
| *G06F 8/60* | (2018.01) |
| *G06F 21/44* | (2013.01) |

(52) U.S. Cl.
CPC .............. *H04L 63/08* (2013.01); *G06F 8/61* (2013.01); *G06F 8/62* (2013.01); *G06F 21/6218* (2013.01); *H04L 67/02* (2013.01); *H04L 67/10* (2013.01); *H04L 67/20* (2013.01); *G06F 8/60* (2013.01); *G06F 21/44* (2013.01); *G06F 21/445* (2013.01); *H04L 63/168* (2013.01)

(58) Field of Classification Search
CPC ..... H04L 29/06; H04L 29/08; H04L 63/0807; H04L 63/08; H04L 67/10; H04L 67/32; H04L 67/42; G06F 21/62; G06F 8/60; G06F 8/61; G06F 21/44; G06F 21/445; G06F 8/62; G06F 21/6218
See application file for complete search history.

(56) References Cited

U.S. PATENT DOCUMENTS

| | | |
|---|---|---|
| 7,055,040 B2 | 5/2006 | Klemba et al. |
| 7,305,090 B1 | 12/2007 | Hayes et al. |
| 8,107,927 B2 | 1/2012 | Sivaram et al. |
| 8,650,558 B2 | 2/2014 | DePoy |

(Continued)

OTHER PUBLICATIONS

Paypal Developer, "CreateAccount API Operation", PayPal, Inc., San Jose, CA (Retrieved on Apr. 4, 2016 from https://developer.paypal.com/docs/classic/api/adaptive-accounts/CreateAccount_API_Operation/).

(Continued)

*Primary Examiner* — Jayesh M Jhaveri
(74) *Attorney, Agent, or Firm* — Polsinelli PC

(57) ABSTRACT

Disclosed are systems, methods, and non-transitory computer-readable storage media for providing an original equipment manufacturer with application program interface (API) for registering an account and creating a custom uniform resource locator (URL) on a content management system, from which the out-of-box experience application can download and install a pre-authorized version of a client application for the content management system.

20 Claims, 5 Drawing Sheets

(56) References Cited

U.S. PATENT DOCUMENTS

| | | | |
|---|---|---|---|
| 8,706,800 B1* | 4/2014 | Ahmed | G06F 9/468 |
| | | | 709/203 |
| 8,855,605 B2 | 10/2014 | Nielsen et al. | |
| 8,856,502 B2 | 10/2014 | Barrus et al. | |
| 9,047,156 B2 | 6/2015 | Ernst et al. | |
| 9,276,914 B2 | 3/2016 | Woodward | |
| 9,544,351 B1 | 1/2017 | Lee et al. | |
| 9,990,118 B1* | 6/2018 | Dennis | G06F 8/61 |
| 10,574,692 B2* | 2/2020 | Drake | H04W 12/02 |
| 2002/0090934 A1 | 7/2002 | Mitchelmore | |
| 2002/0147685 A1 | 10/2002 | Kwan | |
| 2004/0128136 A1 | 7/2004 | Irani | |
| 2007/0201502 A1* | 8/2007 | Abramson | H04L 67/28 |
| | | | 370/429 |
| 2007/0299941 A1 | 12/2007 | Hietasarka et al. | |
| 2009/0008445 A1 | 1/2009 | Chen et al. | |
| 2009/0228404 A1 | 1/2009 | Chen et al. | |
| 2009/0280796 A1 | 9/2009 | Elam et al. | |
| 2009/0288079 A1 | 11/2009 | Macaluso et al. | |
| 2010/0095357 A1 | 4/2010 | Willis et al. | |
| 2010/0323664 A1 | 4/2010 | Willis et al. | |
| 2010/0198730 A1 | 8/2010 | Ahmed et al. | |
| 2011/0219429 A1 | 9/2011 | Lee et al. | |
| 2012/0017282 A1* | 1/2012 | Kang | H04N 21/8456 |
| | | | 726/26 |
| 2012/0144382 A1 | 6/2012 | Matthew et al. | |
| 2012/0185398 A1 | 7/2012 | Weis et al. | |
| 2012/0309353 A1 | 12/2012 | Markov et al. | |
| 2012/0331527 A1 | 12/2012 | Walters | |
| 2013/0139235 A1 | 5/2013 | Counterman | |
| 2013/0191926 A1 | 7/2013 | Chow et al. | |
| 2013/0283298 A1 | 10/2013 | Ali et al. | |
| 2014/0066023 A1 | 3/2014 | Purdy | |
| 2014/0082363 A1 | 3/2014 | Lee et al. | |
| 2014/0143295 A1* | 5/2014 | Girsch | H04L 67/141 |
| | | | 709/202 |
| 2014/0173590 A1 | 6/2014 | Ein-Gal et al. | |
| 2014/0323094 A1 | 10/2014 | Luoma et al. | |
| 2014/0359713 A1* | 12/2014 | Ren | H04L 67/02 |
| | | | 726/4 |
| 2015/0363141 A1 | 12/2015 | Fernandes et al. | |
| 2016/0219027 A1* | 7/2016 | Kaplan | H04W 12/06 |
| 2017/0017438 A1* | 1/2017 | Tsuboi | G06F 21/57 |

OTHER PUBLICATIONS

"HipChat API Reference: users/create", Atlassians, Sydney, Australia. (Retrieved on Mar. 29, 2016 from https://www.hipchat.com/docs/api/method/users/create).

* cited by examiner

_US 10,880,287 B2_

OUT OF BOX EXPERIENCE APPLICATION API INTEGRATION

CROSS-REFERENCE TO RELATED APPLICATIONS

This application is a continuation of U.S. application Ser. No. 15/167,751, filed on May 27, 2016, the content of which is incorporated herein by reference.

BACKGROUND

Many official equipment manufacturers present an "out-of-box" application to introduce a new user with their device, provide an opportunity for the user to register their device, and provide suggested software. A user can thus use the out-of-box application to get started with useful information and software. At times a user wishes to use software (e.g., client software for a content management system) that requires registration to create a new account. Traditional approaches include having the user visit a web page that is distinct from the out-of-box experience application. However, this impedes the interaction flow of the out-of-box experience application.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing an original equipment manufacturer with application program interface (API) for registering an account and creating a custom uniform resource locator (URL) on a content management system, from which the out-of-box experience application can download and install a pre-authorized version of a client application for the content management system.

An example computer implemented method to download and install a client application for a content management system includes sending a request to download a content management system client application to a client download application programming interface (API) at a content management system. This request can be sent by an out-of-box experience application executing on a personal computing device. The request can include an OAuth token identifying an account of the content management system.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for providing an OEM-accessible API for registering an account and creating a custom URL from which the out-of-box experience application can download a pre-authenticated version of the software. The out-of-box experience application can then run the pre-authenticated software in the background which will install and login automatically.

Figure 1:
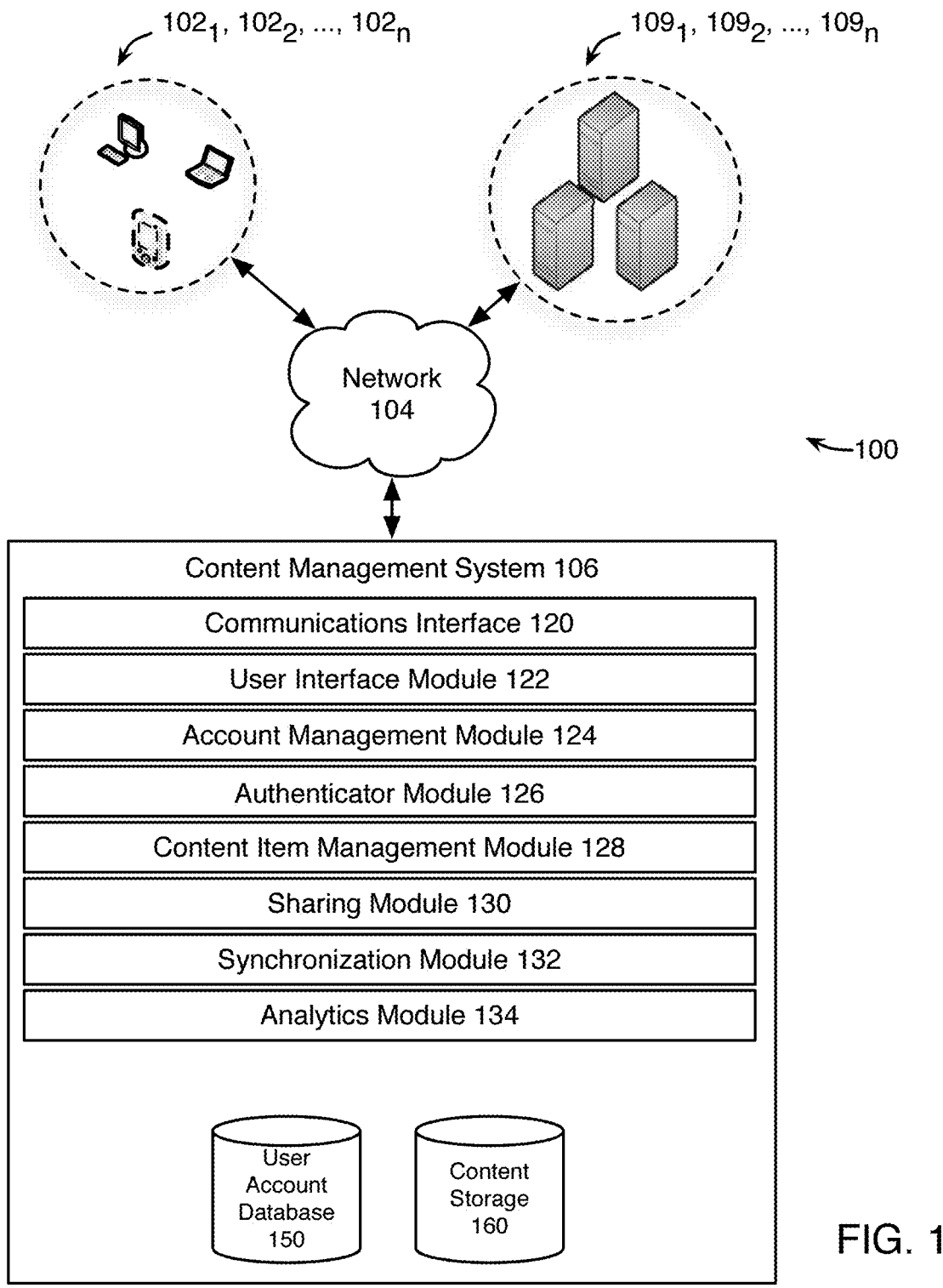
FIG. 1 shows an example configuration of devices and a network in accordance with some embodiments.

FIG. 1 shows an example configuration of devices and a network in accordance with some embodiments, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, ..., $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
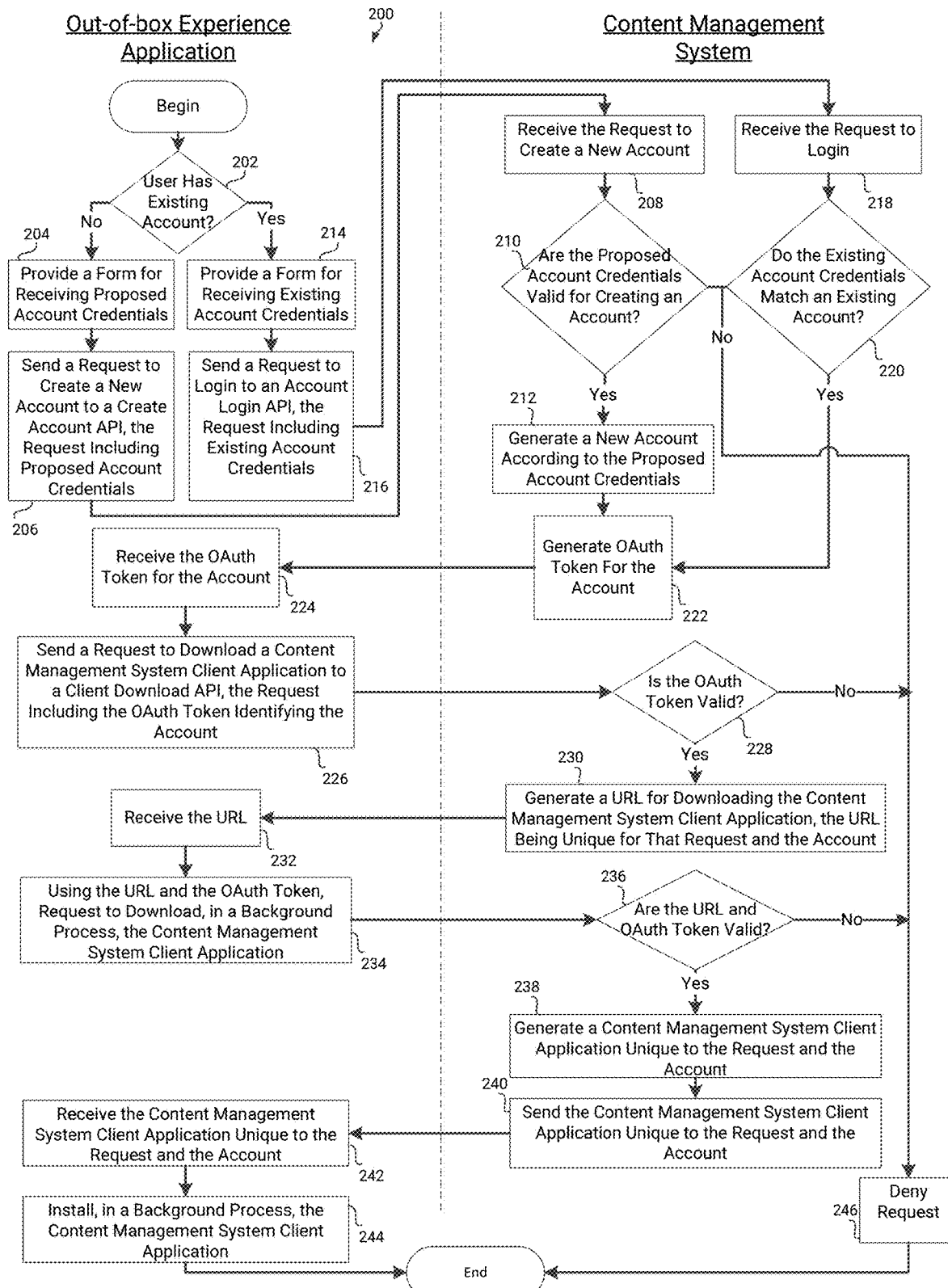
FIG. 2 shows an example method 200 according to some embodiments.
Figure 3A:
FIG. 3A, FIG. 3B, FIG. 3C and FIG. 3D show example user interfaces according to some embodiments.
Figure 3B:
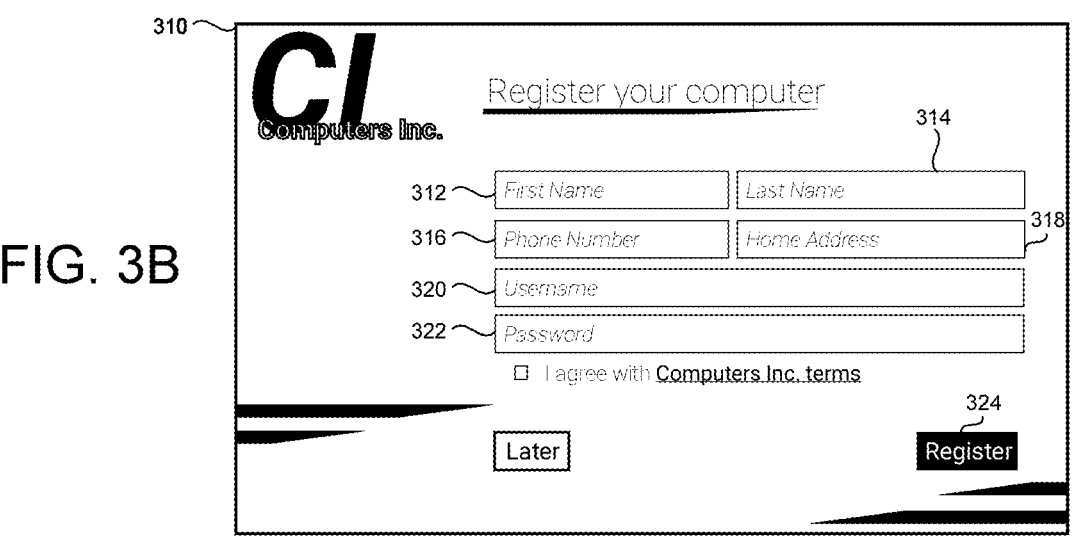
Figure 3C:
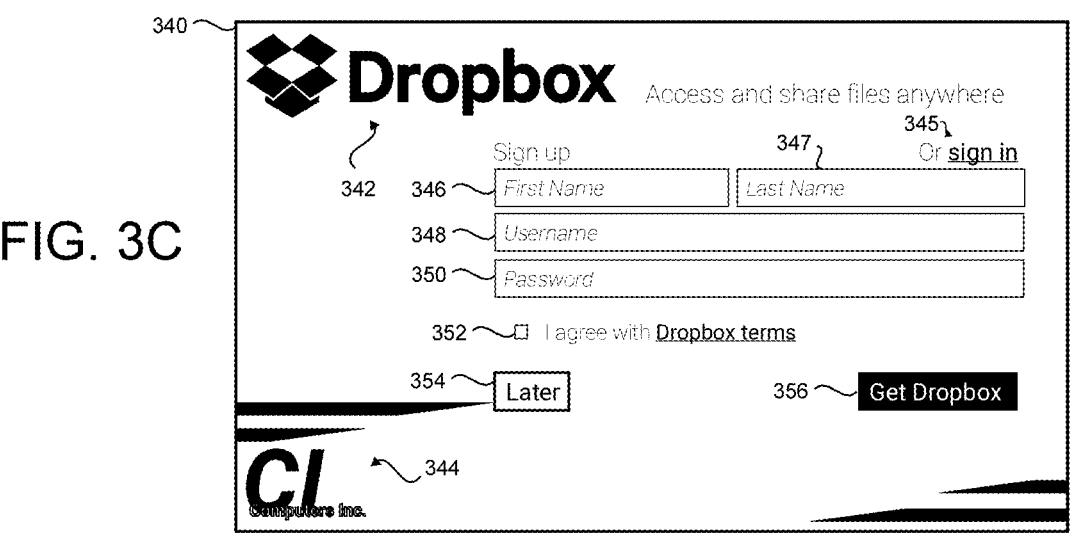
Figure 3D:

FIG. 2 shows an example method 200 according to some embodiments. Example method 200 can represent communications between two devices such as client device 102 running an out-of-box experience application and content management system 106.

An out-of-box experience application can be a program, app, routine, script, file, etc. that introduces a user to a new environment or device (e.g., client device 102, an external hard drive, a new software environment such as an operating system or virtual machine, a new application, a new website, etc.). "New" can mean that the user has not previously accessed, opened, owned, used, etc. the environment or device. The out-of-box experience application can also re-introduce a returning user to an environment or device that the user has not accessed, opened, owned, operated, etc. for a period of time. The out-of-box experience application can be run immediately upon the user engaging the environment or device (e.g., turning on a computer) for the first time. In some embodiments, the out-of-box experience application can be run after a delay (e.g., on a second boot-up of client device 102 or a few minutes after booting up client device 102). The out-of-box experience application can be associated with the new environment or device; for example, an official equipment manufacturer (OEM) that sells computers can include the out-of-box experience application on their computers. In this way, the out-of-box experience application can assist a user to register their product with the OEM, to view and accept disclaimers and license agreements, accept offers (e.g., free, discounted, or trial software), view instruction manuals, etc. The out-of-box experience application is not created by, nor controlled by the content management system. As described herein, the only relationship between the out-of-box experience application and the content management system is that the out-of-box experience application can collect information useful for interactions with one or more API(s) hosted by the content management system.

The out-of-box experience application can begin example method 200 and determine whether a user has an existing account (step 202). Example method 200 can occur at the beginning, middle, or end of the presentation of the out-of-box experience application. The out-of-box experience application can be limited to example method 200 or include other steps, screens, prompts, etc. The existing account of step 202 can refer to an account with content management system 106. Step 202 can include prompting a user whether the user has an existing account. Step 202 can include presenting a login and/or register selection. In some embodiments, the out-of-box application can request a username, email address, or other identifying information as part of a computer registration prompt. The out-of-box application can then use the previously supplied username, email address, or other identifying information to determine if such is associated with an existing account (e.g., using a request to content management system 106).

If the user does not have an existing account, the out-of-box experience application can continue and provide a form for receiving proposed account credentials (step 204). In some embodiments, the form and proposed account credentials are pre-populated with identification information from a previous portion of the out-of-box experience application (e.g., a registration page). Proposed account credentials can include a unique identifier (e.g., username, email address, social security number, phone number, account number, etc.), other information (first name, last name, credit card information, billing preferences, localization preferences, installation preferences, etc.), a proposed authentication means (password, authentication file, physical key, two-factor authentication device, etc.), etc. In some embodiments, the out-of-box experience application can query content management system 106 to determine the required and optional parameters for proposed account credentials (e.g., unique identifier, other information, authentication means, etc.). In some embodiments, the out-of-box experience application can validate the proposed account credentials to ensure conformity with requirements supplied by content management system 106 (e.g., password complexity and length, acceptable characters, etc.).

The out-of-box experience application can continue and send a request to create a new account to a create account application program interface (API), the request including proposed account credentials (step 206). In some embodiments, the out-of-box experience sends API requests (steps 206, 216, and/or 226) directly to the API; alternatively, the out-of-box experience can route the request via a third party (e.g., the OEM that supplied the out-of-box experience application). For example, the third party (third party can refer to the organization that supplies, develops, or controls the out-of-box experience application) can receive the proposed account credentials and then access the create account API from the organization's computers and networks. In some embodiments, the API requests in example method 200 are accomplished using a token that is specific to the third party; this can enhance the security of the API by making these interfaces only accessible to trusted third party partners (private API). Thus, the third party can require that the token is kept within their corporate network and all API requests in example method 200 can be routed through their network, adding their third party token in transit. The out-of-box experience application can encrypt the proposed account credentials using content management system's public key so that the third party is unable to learn private information while retransmitting API request. For enhanced security, content management system 106 can require that these API requests are only performed from whitelisted IP addresses (e.g., the IP address of a trusted third party). Regardless of whether these API requests are routed through the third party network, a token associated with the third party can be used for the API requests.

In some embodiments, the out-of-box experience application can require the user to accept a license agreement, terms and conditions, etc. before the out-of-box experience makes the API request. Such a license agreement, terms and conditions, etc. can be retrieved from content management system 106 via an API request from the out-of-box experience application so that they are current. Content management system 106 can provide the requirements for accepting such a license agreement, terms and conditions, etc. and the out-of-box experience application can implement such requirements. These requirements can include a check box, a signature line, a CAPTCHA, etc.

Content management system 106 can then receive the request to create a new account (step 208).

Content management system 106 can continue and determine whether the proposed account credentials are valid for creating an account (step 210). This can include verifying that the account does not already exist, that the proposed account credentials follow requirements (e.g., password length requirements and acceptable character requirements). In some embodiments, step 210 includes misuse-detection procedures to ensure that the API request is legitimate. For example, content management system 106 can track API requests that are made using a token assigned to the third party (e.g., the organization that configured the out-of-box experience application) and determine any suspicious behavior (e.g., all requests coming from a certain IP block, email address, etc.). In some embodiments, step 210 includes sending a notification to the user using the proposed account credentials (e.g., email address or phone number) and requesting verification.

If the proposed credentials are valid, content management system 106 can continue and generate a new account according to proposed account credentials (step 212). Generating a new account can include processing a payment or billing plan as provided in the proposed account credentials. In some embodiments, step 212 includes notifying the third party that an account was created successfully from the out-of-box experience application.

Returning to step 202, if the user does have an existing account, the out-of-box experience application can provide a form for receiving existing account credentials (step 214). The creation and implementation of the form of step 214 can follow similar principles to that described above for step 204.

The out-of-box experience application can continue and send a request to login to an account login API, the request including existing account credentials (step 216). Step 216 can follow similar principles as described above for step 206. The request can include, in addition to account credentials, a portion of proposed account credentials (e.g., billing information, updated address, contact information, etc.).

Content management system 106 can then receive the request to login (step 218).

Content management system 106 can then determine whether the existing account credentials match an existing account (step 220). In some embodiments, step 220 follows a negative result from step 210. For example, if the unique identifier in the proposed account credentials match an already existing account, content management system 106 can determine of the proposed account credentials (e.g., unique identifier as well as password) match an existing account. In some embodiments, step 220 includes updating the existing account with proposed account credentials; for example, contact information, billing information, etc.

If any of steps 210 or step 220 result in a negative (e.g., the proposed account credentials are not valid for creating an account or the existing account credentials do not match an existing account), content management system 106 can deny the request (step 221). Step 221 can include an error message or error code. In some embodiments, step 221 can use proposed account credentials or existing account credentials to determine localization preferences and can send a localized (e.g., translated) error message. Alternatively, content management system 106 can send the error message (or code) to the out-of-box experience application (or third party) and rely on the out-of-box experience application or third party to provide a localized or otherwise customized error message. Following step 221, the method can return to step 202.

Continuing from step 212 or an affirmative at step 220, content management system 106 can generate an OAuth token for the account (step 222). This OAuth token can be set to expire shortly after creation (e.g., after 5 minutes), can be specific to the IP address of device 102 executing the out-of-box experience application, can be a single use token, etc.

In some embodiments, step 220 includes determining that the user account specifies a requirement for two-factor authentication. Content management system can then indicate to the out-of-box experience application that two-factor authentication is required. The out-of-box experience application can then present a form to the user for entering a two-factor authentication code or a prompt for otherwise validating the request (e.g., via an application on a phone, responding to an email, etc.).

The out-of-box experience application can then receive the OAuth token for the account (step 224). The token can be received via the third party or directly from content management system 106.

The out-of-box experience application can then send a request to download a content management system client application to a client download API, the request including the OAuth token identifying the account (step 226). For example, the out-of-box experience application can send a request to "get_installer_url" API endpoint on content management system 106. In some embodiments, the out-of-box experience application can detect that the content management system client application (or an installer for the content management system client application) has already been installed (i.e., installed on the device running the out-of-box experience application). In such cases, the out-of-box experience application can determine whether the client application is up-to-date. The out-of-box experience application can then send the OAuth token to the locally-installed client application (thus making the rest of step 226 unnecessary).

Content management system 106 can receive the request and determine whether the OAuth token is valid (step 228). This can include verifying that the request comes from an address (e.g., IP address) that is associated with the OAuth token. This can include determining that the OAuth token has not yet expired. This can include determining that the OAuth token has not yet been used.

If the OAuth token is valid, content management system 106 can generate a uniform resource locator (URL) for downloading the content management system client application, the URL being unique for the request and the account (step 230). For example, the URL can be http://example.com/API/e114e4501d2f4e2dcea3e17b546f339c where "e114e4501d2f4e2dcea3e17b546f339c" can be a unique identifier associated with the request. The URL can be limited so that it is only accessible using the token, during a specified period of time (e.g., 5 minutes) and/or can only be accessed a single time and then is deactivated.

The out-of-box experience application can then receive the URL (step 232).

The out-of-box experience application can then, using the URL, request to download, in a background process, the content management system client application (step 234). Being in a background process can include suppressing any notifications that could indicate to the user that the out-of-box experience is making the request of step 234 and downloading the client application. Being in a background process can include continuing on to other parts of the out-of-box experience (e.g., a registration window for another application, closing the out-of-box experience, etc.).

In some embodiments, the request of step 234 specifies a platform (e.g., operating system and/or system architecture), the generation of the content management system client application described below can then be specific to the platform and/or architecture.

In some embodiments, the request of step 226 is effective to generate a URL and the request of step 234 is effective to commence the download of the client application.

Content management system 106 can then determine whether the URL is valid (step 236).

If the URL is valid, content management system 106 can generate a content management system client application unique to the request and the client account (step 238). The content management system client application can be signed by content management system 106 or unsigned. A checksum can be created of the client application. Content management system 106 can then deactivate the URL. In some embodiments, the content management system client application unique to the request that is generated in step 238 is a light installer application that is configured to contain account credentials (e.g., bundled with an OAuth token) and download a full client application that is not specific to the account. Such an installer application can then authenticate the full client application when it is downloaded and installed (e.g., by passing the OAuth token to it). The client application can be "pre-authenticated" meaning that it includes the necessary credentials to connect with content management system 106 and access the particular account (e.g., that is it bundled with an OAuth token for the account). In some embodiments, the bundled OAuth token is the same as the token generated in step 222, alternatively it can be a new OAuth token. In some embodiments this OAuth token is limited such that a new OAuth token must be generated upon installation on the local machine (i.e., the machine running the out-of-box experience application).

Content management system 106 can then send the content management system client application unique to the request and the account (step 240) to the out-of-box experience application.

The out-of-box experience application can then receive the content management system client application unique to the request and the account (step 242). Step 242 can include validating the content management system client application. Such verification can include checking a checksum for the client application, determining that a signature in the client application is associated with content management system 106, scanning the client application for malware or viruses, etc.

The out-of-box experience application can then install, in a background process, the content management system client application (step 244). Step 244 can include removing any other installation of the content management system client application. Step 244 can include, after installation, removing the received content management system client application (e.g., an installer or other temporary files) from memory. In some embodiments, step 244 can include transferring an OAuth token (e.g., the OAuth token received at step 224) to the content management system client application. This can be especially useful in situations where the content management system client application is not bundled with an OAuth token. At the conclusion of the installation procedure, the content management system client application can present a non-modal, unobtrusive window element, that displays an auto-expiring window (e.g., a "toast" notification) to the user indicating that the client application is ready for use and, if needed, further configuration (e.g., establish a local location to contain a local copy of a collection that is in synchronization with a collection on content management system 106).

If any of steps 228 or 236 result in a negative (e.g., the OAuth token or URL is invalid), then content management system 106 can deny the request (step 246). Step 246 can include an error message or error code. In some embodiments, step 246 can use proposed account credentials or existing account credentials to determine localization preferences and can send a localized (e.g., translated) error message. Alternatively, content management system 106 can send the error message (or code) to the out-of-box experience application (or third party) and rely on the out-of-box experience application or third party to provide a localized or otherwise customized error message. In some embodiments, step 246 can include returning to a prior step (e.g., step 202) as appropriate.

In some embodiments, a version of the content management system client application is preloaded alongside (but largely independent of) the out-of-box experience. After a predetermined period of time, the preloaded client application can determine whether the out-of-box experience has been run and the user has made a selection regarding content management system 106 within the out-of-box experience application. If it has not been run or the user has not made a selection regarding content management system 106 (e.g., the user never ran the out-of-box experience application or exited it before completion), then the preloaded client application can query the user to determine if the user wishes to create an account or login to an existing account for content management system 106 and the content management system client application. The preloaded client application can then taken necessary action (e.g., download and install an up to date content management system client application from content management system 106, accept user credentials to authorize the client application, etc.) to complete installation.

In some embodiments where a version of the content management system client application is preloaded along with the out-of-box experience, the out-of-box experience can, at step 224, send the OAuth token to the preloaded client application. Alternatively, content management system 106 can send the OAuth token directly to the preloaded client application.

Some or all of the API requests herein disclosed can be combined. For example, the request to login at step 214 can include a request to download the content management system client application of step 226 and download the content management system client application. An example of such a request can be http://example.com/API?username=USER&password=1234&download_app=TRUE. As another example, steps 226 and 234 can be combined so that only one communication is required (instead of both step 226 and step 236) to download the client application.

In some embodiments, example method 200 can be performed in the background (e.g., without much user interaction). For example, an organization (e.g., a school, company, social network provider) may contain an account for a user (e.g., student@exampleschool.com) and when the user activates an environment (e.g., computer, virtual machine, etc.) the out-of-box experience application can go through example method 200 using credentials that the user has provided to the organization (e.g., student@exampleschoo.com). In some embodiments, the organization can create and maintain a credentials for the user (e.g., create a pseudo-random password); for example, the user can log into the organization and then the organization can (using stored credentials for the user) log the user in to content management system 106.

FIG. 3A, FIG. 3B, FIG. 3C and FIG. 3D show example user interfaces 300, 310, 340 and 360 according to various embodiments. For example, example user interfaces 300, 310, 340, and 360 can be part of an out-of-box experience application. When the out-of-box experience application first begins, example user interface 300 can be shown. After selecting "begin" (302), example user interface 310 can be shown. Example user interface 310 can be a registration page for receiving user information and/or credentials for the third party (e.g., the OEM, or organization that created the out-of-box-experience application). For example, a user can enter their first name (box 312), last name (box 314), phone number (box 316), address (box 318), username (box 320), and password (box 322). The username and password can be associated with an account with the third party.

After receiving a selection of register (box 324), the out-of-box application can present a user interface for signing up or logging in to content management system 106. For example, example user interface 340 can be effective for collecting proposed account credentials of step 204. A selection of "sign in" (box 345) can also be received to inform step 202. Proposed account credentials can include first name (box 346), last name (box 347), username (box 348), password (box 350), etc. A user can view and accept content management system terms (box 354) and submit the proposed credentials (box 356). Upon selecting box 356, the out-of-box experience can perform step 206 by sending the proposed account credentials to a create account API on content management system 106.

In some embodiments, information entered in example user interface 310 can inform the information of example user interface 340. For example, the out-of-box experience application can receive a first name in box 312 and last name in box 314; the out-of-box can pre-populate boxes 346 and 347 using the information from boxes 312 and 314, respectively. Similarly, username of box 320 and password of box 322 can be used to prepopulate boxes 348 and 350 respectively. As discussed above, the out-of-box experience can use the username of box 320 to determine whether that username is associated with an account on content management system 106. In some embodiments, if the out-of-box experience has enough information for logging in or registering with content management system 106, user interface 340 can be omitted and the information can be supplied in the background.

In some embodiments, a user can select "later" (box 354) to resume the registration or logging in process with content management system 106 at a later time. For example, if a content management system client application is already installed on the local machine, the out-of-box experience application can signal to the client application to open and request registration at a later time.

The principles herein disclosed enable a third party organization to integrate customized logos, text, color schemes, etc. within a registration (or login) page such as example user interface 340. For example, third party logo 344 can be presented on the same area as content management system logo 342.

At the end of the out-of-box experience application, example user interface 360 can be presented. In some embodiments, content management system client application can be downloaded and installed while example user interface 360 is presented. Closing example user interface 360 can, in some embodiments, not interfere with the downloading and installing of content management system client application. This can be accomplished by the out-of-box experience application spawning a separate process (e.g., to perform steps 224, 226, 232, 234, 242, and/or 244) that can persist even after the out-of-box experience application is closed.

Figure 4B:
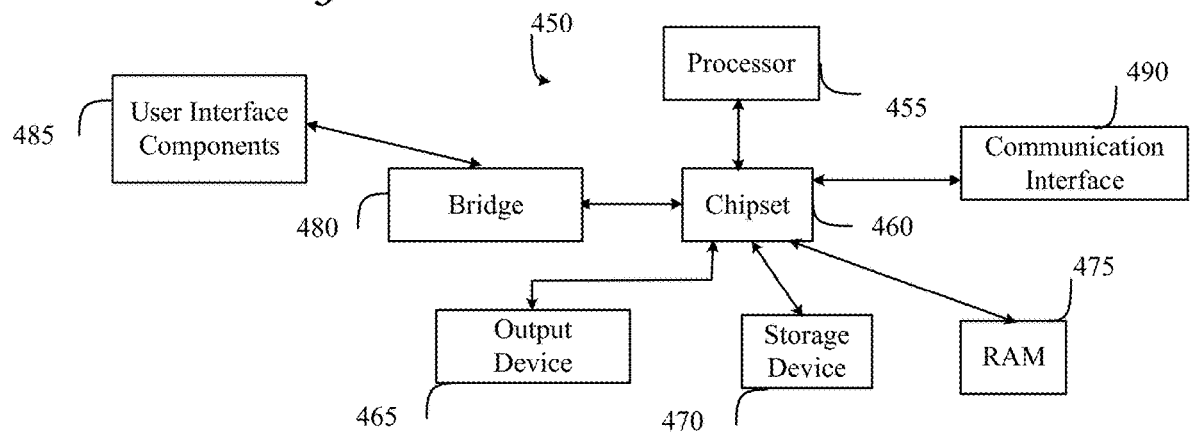
FIG. 4B shows an example possible system embodiment for implementing various embodiments of the present technology.
Figure 4A:
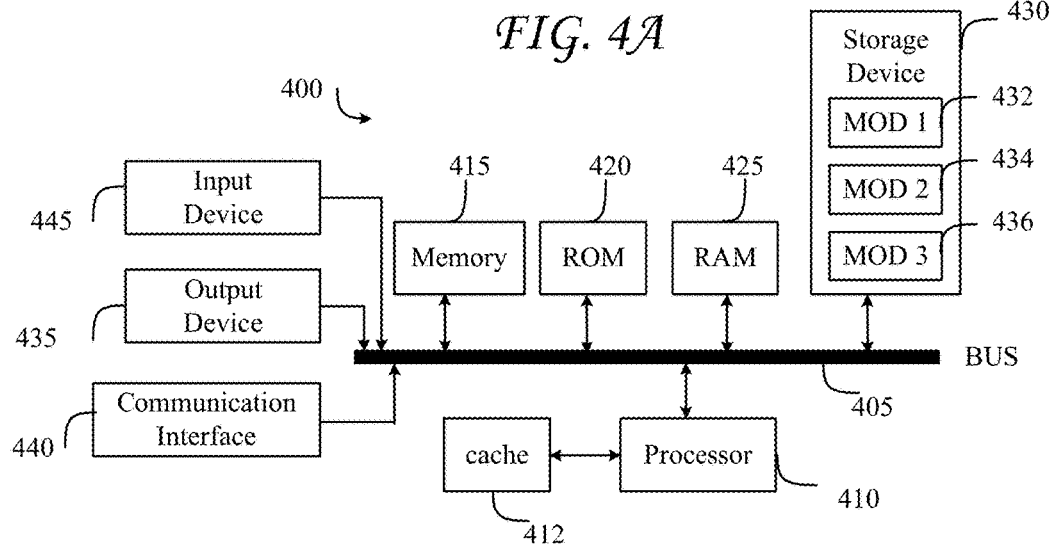
FIG. 4A shows an example possible system embodiment for implementing various embodiments of the present technology.

FIG. 4A and FIG. 4B show example possible system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Example system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that example systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
sending, by an out-of-box-experience-application on a client device to a content management system, an application programming interface (API) call comprising a first request to download a client application associated with the content management system, the first request including a token identifying a user account registered on the content management system;
based on the API call, receiving, from the content management system, an address to a location on the content management system from which the client device can download the client application;
sending, by the out-of-box-experience-application on the client device, a second request to download the client application, the second request being directed to the address to the location from which the client device can download the client application;
based on the second request, downloading, by the out-of-box-experience-application on the client device, a client application package comprising a version of the client application unique to at least one of the user account or the second request to download the client application wherein the client application package is bundled with the token identifying the user account registered on the content management system;
installing the client application at the client device; and
automatically logging in the user account using the token and the client application installed at the client device.

2. The method of claim 1, further comprising:
launching, at the client device, the client application logged into the user account.

3. The method of claim 1, further comprising:
prior to the user account being registered at the content management system, obtaining, via a form within the out-of-box-experience-application, account credentials for creating the user account;
sending, to an account API associated with the content management system, a third request to create the user account, the third request including the account credentials; and
receiving, by the client device, the token for the user account.

4. The method of claim 1, further comprising:
obtaining, via a form within the out-of-box-experience-application, existing account credentials associated with the user account;
sending, to an account login API associated with the content management system, the existing account credentials; and
receiving, by the client device, the token for the user account.

5. The method of claim 1, further comprising:
uninstalling, at the client device, an existing installer program that is associated with the content management system present on the client device.

6. The method of claim 1, wherein the version of the client application unique to at least one of the user account or the second request comprises a pre-authenticated client application, the pre-authenticated client application being bundled with at least one of the token or user credentials associated with the user account.

7. The method of claim 1, wherein the version of the client application unique to at least one of the user account or the second request comprises a light installer application comprising at least one of the token or account credentials associated with the user account, the light installer application being configured to use the at least one of the token or the account credentials to authenticate the user account with the content management system and download a full client application associated with the content management system.

8. The method of claim 1, wherein the token is specifically designated for an Internet Protocol address associated with the second request, and wherein the token is set to expire after a specific time period.

9. A system comprising:
one or more processors; and
a non-transitory computer-readable medium having stored therein instructions that, when executed by the one or more processors, cause the system to:
send, by an out-of-box-experience-application on the system to a content management system, an application programming interface (API) call comprising a first request to download a client application associated with the content management system, the first request including a token identifying a user account registered on the content management system;
based on the API call, receive, from the content management system, an address to a location on the content management system from which the system can download the client application;
send, by the out-of-box-experience-application on the system, a second request to download the client application, the second request being directed to the address to the download location;
based on the second request, download, by the out-of-box-experience-application on the system, a client application package comprising a version of the client application unique to at least one of the user account or the second request to download the client application wherein the client application package is bundled with the token identifying the user account registered on the content management system;
install the client application at the client device; and
automatically log in the user account using the token and the client application installed at the client device.

10. The system of claim 9, the non-transitory computer-readable medium having stored therein instructions that, when executed by the one or more processors, cause the system to:
launch the client application logged into the user account.

11. The system of claim 9, the non-transitory computer-readable medium having stored therein instructions that, when executed by the one or more processors, cause the system to:
prior to the user account being registered at the content management system, obtain, via a form within the out-of-box-experience-application, account credentials for creating the user account;
send, to an account API associated with the content management system, a third request to create the user account, the third request including the account credentials; and
receive the token for the user account.

12. The system of claim 9, the non-transitory computer-readable medium having stored therein instructions that, when executed by the one or more processors, cause the system to:
obtain, via a form within the out-of-box-experience-application, existing account credentials associated with the user account;
send, to an account login API associated with the content management system, the existing account credentials; and
receive the token for the user account.

13. The system of claim 9, the non-transitory computer-readable medium having stored therein instructions that, when executed by the one or more processors, cause the system to:
uninstall an existing installer program that is associated with the content management system present on the system.

14. The system of claim 9, wherein the version of the client application unique to at least one of the user account or the second request comprises a pre-authenticated client application, the pre-authenticated client application being bundled with at least one of the token or user credentials associated with the user account.

15. The system of claim 9, wherein the version of the client application unique to at least one of the user account or the second request comprises a light installer application comprising at least one of the token or account credentials associated with the user account, the light installer application being configured to use the at least one of the token or the account credentials to authenticate the user account with the content management system and download a full client application associated with the content management system.

16. The system of claim 9, wherein the token is specifically designated for an Internet Protocol address associated with the second request, and wherein the token is set to expire after a specific time period.

17. A non-transitory computer-readable medium comprising instructions stored thereon that, when executed by one or more processors, cause the one or more processors to:
send, by an out-of-box-experience-application on a client device to a content management system, an application programming interface (API) call comprising a request to download a client application associated with the content management system, the request including a token identifying a user account registered on the content management system;
based on the API call, receive, from the content management system, an address to a location on the content management system from which the client device can download the client application;
send, by the out-of-box-experience-application on the client device, a second request to download the client application, the second request being directed to the address to the download location;

based on the second request, download, by the out-of-box-experience-application on the client device, a client application package comprising a version of the client application tailored to at least one of the user account, the client device, or the second request to download the client application, wherein the client application package is bundled with the token identifying the user account registered on the content management system;

install the client application at the client device; and automatically log in the user account using the token and the client application installed at the client device.

18. The non-transitory computer-readable medium of claim 17, the non-transitory computer-readable medium having stored therein instructions that, when executed by the one or more processors, cause the one or more processors to:

launch the client application logged into the user account.

19. The non-transitory computer-readable medium of claim 17, the non-transitory computer-readable medium having stored therein instructions that, when executed by the one or more processors, cause the one or more processors to:

prior to the user account being registered at the content management system, obtain, via a form within the out-of-box-experience-application, account credentials for creating the user account;

send, to an account API associated with the content management system, a third request to create the user account, the third request including the account credentials; and receive the token for the user account.

20. The non-transitory computer-readable medium of claim 17, the non-transitory computer-readable medium having stored therein instructions that, when executed by the one or more processors, cause the one or more processors to:

obtain, via a form within the out-of-box-experience-application, existing account credentials associated with the user account;

send, to an account login API associated with the content management system, the existing account credentials; and receive the token for the user account.

\* \* \* \* \*